US012737619B2

(12) United States Patent
Hubert et al.

(10) Patent No.: US 12,737,619 B2
(45) Date of Patent: Sep. 15, 2026

(54) OPTIMIZING ALGORITHMS FOR HARDWARE DEVICES

(71) Applicant: GDM Holding LLC, Mountain View, CA (US)

(72) Inventors: Thomas Keisuke Hubert, London (GB); Shih-Chieh Huang, London (GB); Alexander Novikov, London (GB); Alhussein Fawzi, St. Albans (GB); Bernardino Romera-Paredes, London (GB); David Silver, Hitchin (GB); Demis Hassabis, London (GB); Grzegorz Michal Swirszcz, London (GB); Julian Schrittwieser, London (GB); Pushmeet Kohli, London (GB); Mohammadamin Barekatain, London (GB); Matej Balog, London (GB); Francisco Jesus Rodriguez Ruiz, London (GB)

(73) Assignee: GDM Holding LLC, Mountain View, CA (US)

( * ) Notice: Subject to any disclaimer, the term of this patent is extended or adjusted under 35 U.S.C. 154(b) by 918 days.

(21) Appl. No.: 17/959,210

(22) Filed: Oct. 3, 2022

(65) Prior Publication Data

US 2024/0127045 A1 Apr. 18, 2024

(51) Int. Cl.
*G06N 3/08* (2023.01)
*G06F 16/901* (2019.01)
(Continued)

(52) U.S. Cl.
CPC ............... *G06N 3/08* (2013.01); *G06N 3/063* (2013.01); *G06F 16/9027* (2019.01); *G06N 3/092* (2023.01)

(58) Field of Classification Search
CPC .......... G06N 3/08; G06N 3/063; G06N 3/092; G06F 16/9027
See application file for complete search history.

(56) References Cited

U.S. PATENT DOCUMENTS

2020/0151580 A1* 5/2020 Horesh .................. G06N 3/084
2020/0234167 A1* 7/2020 Xiao ........................ G06N 7/01
(Continued)

FOREIGN PATENT DOCUMENTS

CN 107798385 A 3/2018
CN 113179660 A 7/2021
(Continued)

OTHER PUBLICATIONS

Breuker DM, Uiterwijk JW, van den Herik HJ. Replacement schemes for transposition tables. ICCA Journal. 1994;17(4):183-93. (Year: 1994).*

(Continued)

*Primary Examiner* — Michelle T Bechtold
*Assistant Examiner* — Nicholas S Wu
(74) *Attorney, Agent, or Firm* — Fish & Richardson P.C.

(57) ABSTRACT

A method performed by one or more computers for obtaining an optimized algorithm that (i) is functionally equivalent to a target algorithm and (ii) optimizes one or more target properties when executed on a target set of one or more hardware devices. The method includes: initializing a target tensor representing the target algorithm; generating, using a neural network having a plurality of network parameters, a tensor decomposition of the target tensor that parametrizes a candidate algorithm; generating target property values for each of the target properties when executing the candidate algorithm on the target set of hardware devices; determining a benchmarking score for the tensor decomposition based on the target property values of the candidate algorithm; gen-
(Continued)

erating a training example from the tensor decomposition and the benchmarking score; and storing, in a training data store, the training example for use in updating the network parameters of the neural network.

20 Claims, 8 Drawing Sheets

(51) Int. Cl.
*G06N 3/063* (2023.01)
*G06N 3/092* (2023.01)

(56) References Cited

U.S. PATENT DOCUMENTS

| | | | | |
|---|---|---|---|---|
| 2022/0108156 | A1 | 4/2022 | Hunter et al. | |
| 2022/0147828 | A1 | 5/2022 | David et al. | |
| 2022/0171727 | A1 | 6/2022 | Ghosal | |
| 2022/0305646 | A1 | 9/2022 | Jain et al. | |
| 2024/0249123 | A1 * | 7/2024 | Saragadam | G06N 3/045 |

FOREIGN PATENT DOCUMENTS

| | | | |
|---|---|---|---|
| CN | 114761974 | A | 7/2022 |
| TW | 202137072 | | 10/2021 |
| TW | 202143042 | | 11/2021 |
| TW | 202234236 | | 9/2022 |

OTHER PUBLICATIONS

Kolda TG, Bader BW. Tensor decompositions and applications. SIAM review. Jan. 1, 2009;51(3):455-500. (Year: 2009).*
Browne CB, Powley E, Whitehouse D, Lucas SM, Cowling PI, Rohlfshagen P, Tavener S, Perez D, Samothrakis S, Colton S. A survey of monte carlo tree search methods. IEEE Transactions on Computational Intelligence and AI in games. Feb. 3, 2012;4(1):1-43. (Year: 2012).*
Silver D, Huang A, Maddison CJ, Guez A, Sifre L, van den Driessche G, Schrittwieser J, Antonoglou I, Panneershelvam V, Lanctot M, Dieleman S. Mastering the game of Go with deep neural networks and tree search. Nature. Jan. 2016;529:28. (Year: 2016).*
Zhang H, Yu T. AlphaZero. InDeep reinforcement learning: fundamentals, research and applications Jun. 30, 2020 (pp. 391-415). Singapore: Springer Singapore. (Year: 2020).*
Chen W, Zhu X, Sun R, He J, Li R, Shen X, Yu B. Tensor low-rank reconstruction for semantic segmentation. InEuropean conference on computer vision Aug. 23, 2020 (pp. 52-69). Cham: Springer International Publishing. (Year: 2020).*
Xiao Q, Zheng S, Wu B, Xu P, Qian X, Liang Y. Hasco: Towards agile hardware and software co-design for tensor computation. In2021 ACM/IEEE 48th Annual International Symposium on Computer Architecture (ISCA) Jun. 14, 2021(pp. 1055-1068). IEEE. (Year: 2021).*
Takayama H, Zhao Q, Hontani H, Yokota T. Bayesian tensor completion and decomposition with automatic CP rank determination using MGP shrinkage prior. SN Computer Science. May 2022;3(3):225. (Year: 2022).*
Qu, Zheng, et al. "Hardware-enabled efficient data processing with tensor-train decomposition." IEEE Transactions on Computer-Aided Design of Integrated Circuits and Systems 41.2 (2021):372-385. (Year: 2021).*
Yang Z, Shan J, Zhang Z. Hardware-efficient mixed-precision CP tensor decomposition. arXiv preprint arXiv:2209.04003. Sep. 8, 2022. (Year: 2022).*
[No Author Listed] [online], "Fast matrix multiplication algorithms catalogue," Université de Lille, retrieved on Dec. 12, 2023, retrieved from URL: <https://fmm.univ-lille.fr/>, 2 pages.
[No Author Listed] [online], "Intelligence Processing Unit," Jul. 23, 2021, Internet Archive: Wayback Machine URL <https://web.archive.org/web/20210723150349/https://www.graphcore.ai/products/ipu>, retrieved on Dec. 18, 2023, 8 pages.
Abadi et al., "TensorFlow: A System for Large-Scale Machine Learning," 12th USENIX Symposium on Operating Systems Design and Implementation, Nov. 2-4, 2016, pp. 265-283.
Algebraic Complexity Theory, Springer Science & Business Media, vol. 315, 2013, 3 pages (Abstract only).
Alman et al., "A refined laser method and faster matrix multiplication," Proceedings of the 2021 ACM-SIAM Symposium on Discrete Algorithms, Jan. 2021, pp. 522-539.
Ballard et al., "The geometry of rank decompositions of matrix multiplication II: 3×3 matrices," Journal of Pure and Applied Algebra, Aug. 1, 2019, 223(8):3205-3224.
Balog et al., "Fast training of sparse graph neural networks on dense hardware," CoRR, arXiv:1906.11786, Jun. 27, 2019, 15 pages.
Bansal et al., "HOList: An environment for machine learning of higher order logic theorem proving," International Conference on Machine Learning, May 24, 2019, pp. 454-463.
Battaglia et al., "Relational inductive biases, deep learning, and graph networks," CoRR, arXiv:1806.01261, Jun. 4, 2018, 37 pages.
Benson et al., "A framework for practical parallel fast matrix multiplication," Proceedings of the 20th ACM SIGPLAN Symposium on Principles and Practice of Parallel Programming, Jan. 2015, pp. 42-53.
Bernardi et al., "General tensor decomposition, moment matrices and applications," Journal of Symbolic Computation, May 1, 2013, 52:51-71.
Bläser, "Fast matrix multiplication," Theory of Computing, Dec. 24, 2013, pp. 1-60.
Bradbury et al. [online], "JAX: composable transformations of Python+NumPy programs," retrieved on Dec. 8, 2023, retrieved from URL: <GitHub http://github.com/google/jax>, 11 pages.
Brown et al., "Language models are few-shot learners," Advances in neural information processing systems, 2020, 33:1877-1901.
Bunel et al., "Learning to superoptimize programs," International Conference on Learning Representations, Apr. 2017, 14 pages.
Burichenko et al., "On symmetries of the Strassen algorithm," CoRR, arXiv:1408.6273, Aug. 26, 2014, 16 pages.
Chiantini et al., "The geometry of rank decompositions of matrix multiplication I: 2×2 matrices," Experimental Mathematics, Jul. 3, 2019, 28(3):322-327.
Coppersmith et al., "Matrix multiplication via arithmetic progressions," Proceedings of the nineteenth annual ACM symposium on Theory of computing, Jan. 1, 1987, pp. 1-6.
Dabney et al., "Distributional reinforcement learning with quantile regression," Proceedings of the AAAI Conference on Artificial Intelligence, Apr. 29, 2018, 32(1):2892-2901.
Dabney et al., "Implicit quantile networks for distributional reinforcement learning," International conference on machine learning, Jul. 3, 2018, pp. 1096-1105.
Dalgaard et al., "Global optimization of quantum dynamics with AlphaZero deep exploration," npj Quantum Information, Jan. 14, 2020, 6(1):6-15.
De Groote, "On varieties of optimal algorithms for the computation of bilinear mappings II. Optimal algorithms for 2×2-matrix multiplication," Theoretical Computer Science, Jan. 1978, 7(2):127-148.
Drevet et al., "Optimization techniques for small matrix multiplication," Theoretical Computer Science, May 2011, 412:2219-2236.
Elser, "A network that learns Strassen multiplication," The Journal of Machine Learning Research, Jan. 1, 2016, 17(1):3964-3976.
Grochow et al., "Designing Strassen's algorithm," CoRR, arXiv:1708.09398, Aug. 30, 2017, 10 pages.
Grochow et al., Matrix multiplication algorithms from group orbits, CoRR, arXiv:1612.01527, Dec. 5, 2016, 15 pages.
Heule et al., "New ways to multiply 3×3-matrices," Journal of Symbolic Computation, May 1, 2021, 104:899-916.
Hillar et al., "Most tensor problems are NP-hard," Journal of the ACM, Nov. 1, 2013, 60(6):1-39.
Ho et al., "Axial attention in multidimensional transformers," CoRR, arXiv:1912.12180, Dec. 20, 2019, 11 pages.
Hopcroft et al., "On minimizing the number of multiplications necessary for matrix multiplication," SIAM Journal on Applied Mathematics, Jan. 1971, 20(1):30-36.

(56) References Cited

OTHER PUBLICATIONS

Huang et al., "Strassen's algorithm reloaded on GPUs," ACM Transactions on Mathematical Software, Mar. 20, 2020, 46(1):1-22.
Huang et al., "Strassen's algorithm reloaded," Proceedings of the International Conference for High Performance Computing, Networking, Storage and Analysis, Nov. 13, 2016, pp. 690-701.
Hubert et al., "Learning and planning in complex action spaces," International Conference on Machine Learning, Jul. 1, 2021, pp. 4476-4486.
International Search Report and Written Opinion in International Appln. No. PCT/EP2023/077237, mailed on Dec. 13, 2023, 17 pages.
Kaliszyk et al., "Reinforcement learning of theorem proving," Proceedings of the 32nd International Conference on Neural Information Processing Systems, Dec. 2018, pp. 8836-8847.
Kingma et al., "Adam: a method for stochastic optimization," International Conference on Learning Representations, May 7-9, 2015, 15 pages.
Kolda et al., "Tensor decompositions and applications," SIAM review, Aug. 6, 2009, 51(3):455-500.
Laderman, "A noncommutative algorithm for multiplying 3×3 matrices using 23 multiplications," Bulletin of the American Mathematical Society, Jan. 1976, 82(1):126-128.
Lagoudakis et al., "Algorithm Selection using Reinforcement Learning," Proceedings of the Seventeenth International Conference on Machine Learning, Jun. 29, 2000, pp. 511-518.
Landsberg, "Geometry and complexity theory," Cambridge University Press, Sep. 28, 2017, 351 pages.
Le Gall, "Powers of tensors and fast matrix multiplication," Proceedings of the 39th international symposium on symbolic and algebraic computation, Jul. 23, 2014, pp. 296-303.
Li et al., "Strong generalization and efficiency in neural programs," CoRR, arXiv:2007.03629, Jul. 7, 2020, 25 pages.
Lim et al., "Tensors in computations," Acta Numerica, May 2021, 30:555-764.
Loshchilov et al., "Decoupled weight decay regularization," International Conference on Learning Representations, May 2019, 18 pages.
Loshchilov et al., "Fixing weight decay regularization in Adam," CoRR, arXiv:1711.05101, Nov. 14, 2017, 13 pages.
Mirhoseini et al., "A graph placement methodology for fast chip design," Nature, Jun. 10, 2021, 594(7862):207-212.
Pan, "Fast feasible and unfeasible matrix multiplication," CoRR, arXiv:1804.04102, Apr. 11, 2018, 35 pages.
Piotrowski et al., "ATPboost: Learning premise selection in binary setting with ATP feedback," International Joint Conference on Automated Reasoning, Jul. 14-17, 2018, pp. 566-574.
Popova et al., "Deep reinforcement learning for de novo drug design," Science Advances, Jul. 25, 2018, 4:eaap7885-7899.
Schmidhuber , "Evolutionary Principles in Self-Referential Learning. On Learning now to Learn: The Meta-Meta-Meta . . . -Hook," Diploma thesis, Technische Universitat Munchen, May 14, 1987, 64 pages.
Schönhage, "Partial and total matrix multiplication," SIAM Journal on Computing, Aug. 1981, 10(3):434-455.
Sedoglavic et al., "A non-commutative algorithm for multiplying (7 ×7) matrices using 250 multiplications," CoRR, arXiv:1712.07935, Dec. 21, 2017, 13 pages.
Sedoglavic et al., "A non-commutative algorithm for multiplying 5×5 matrices using 99 multiplications," CoRR, arXiv:1707.06860, Jul. 18, 2017, 6 pages.
Sedoglavic et al., "The Tensor Rank of 5×5 Matrices Multiplication is Bounded by 98 and Its Border Rank by 89," Proceedings of the 2021 on International Symposium on Symbolic and Algebraic Computation, Jul. 18, 2021, pp. 345-351.
Segler et al., "Planning chemical syntheses with deep neural networks and symbolic AI," Nature, Mar. 29, 2018, 555(7698):604-10.
Silver et al., "A general reinforcement learning algorithm that masters chess, shogi, and Go through self-play," Science, Dec. 7, 2018, 362(6419):1140-1144.
Silver et al., "Mastering the game of Go with deep neural networks and tree search," Nature, Jan. 2016, 529(7587):484-489.
Smirnov et al., "The bilinear complexity and practical algorithms for matrix multiplication," Computational Mathematics and Mathematical Physics, Dec. 2013, 53:1781-1795.
Strassen et al., "The asymptotic spectrum of tensors and the exponent of matrix multiplication," 27th Annual Symposium on Foundations of Computer Science, Oct. 27, 1986, pp. 49-54.
Strassen, "Gaussian elimination is not optimal," Numerische mathematik, Aug. 4, 1969, 13(4):354-356.
Theoria Motus Corporum Coelestium in Sectionibus Conicis Solum Ambientium, Perthes and Besser, 1809, 2 pages (Abstract only).
Tschannen et al., "StrassenNets: Deep learning with a multiplication budget," International Conference on Machine Learning, Jul. 3, 2018, pp. 4985-4994(PMLR, 2018).
Vaswani et al., "Attention is all you need," International Conference on Neural Information Processing Systems, Dec. 2017, pp. 5998-6008.
Vervliet et al., "Tensorlab 3.0," Mar. 2016, retrieved from URL: <https://www.tensorlab.net/>, 156 pages.
Wagner, "Constructions in combinatorics via neural networks," CoRR, arXiv:2104.14516, Apr. 29, 2021, 23 pages.
Winograd, "A new algorithm for inner product," IEEE Transactions on Computers, Jul. 1968, 17(7):693-694.
Xiao et al., "HASCO: Towards Agile HArdware and Software CO-design for Tensor Computation," 2021 ACM/IEEE 48th Annual International Symposium on Computer Architecture, Jun. 14, 2021, pp. 1055-1068.
Ye et al., "Fast structured matrix computations: tensor rank and Cohn-Umans method," Foundations of Computational Mathematics, Feb. 2018, 18:45-95.
Zhang et al., "A reinforcement learning approach to job-shop scheduling," International Joint Conferences on Artificial Intelligence, Aug. 20, 1995, pp. 1114-1120.
Zhou et al., "Optimization of molecules via deep reinforcement learning," Scientific reports, Jul. 24, 2019, 9(1): 10752-10762.
Zombori et al., "Prolog Technology Reinforcement Learning Prover (System Description)," International Joint Conference on Automated Reasoning, Jun. 24, 2020, pp. 489-507.
International Preliminary Report on Patentability in International Appln. No. PCT/EP2023/077237, mailed on Mar. 1, 2025, 11 pages.
Notice of Allowance in Taiwan Appln. No. 112137899, dated May 2, 2024, 12 pages (with English translation).
Office Action in Taiwan Appln. No. 113129006, mailed on Aug. 7, 2025, 18 pages (with English translation).
Office Action in Indian Appln. No. 202517032778, mailed on May 6, 2026, 8 pages.

* cited by examiner

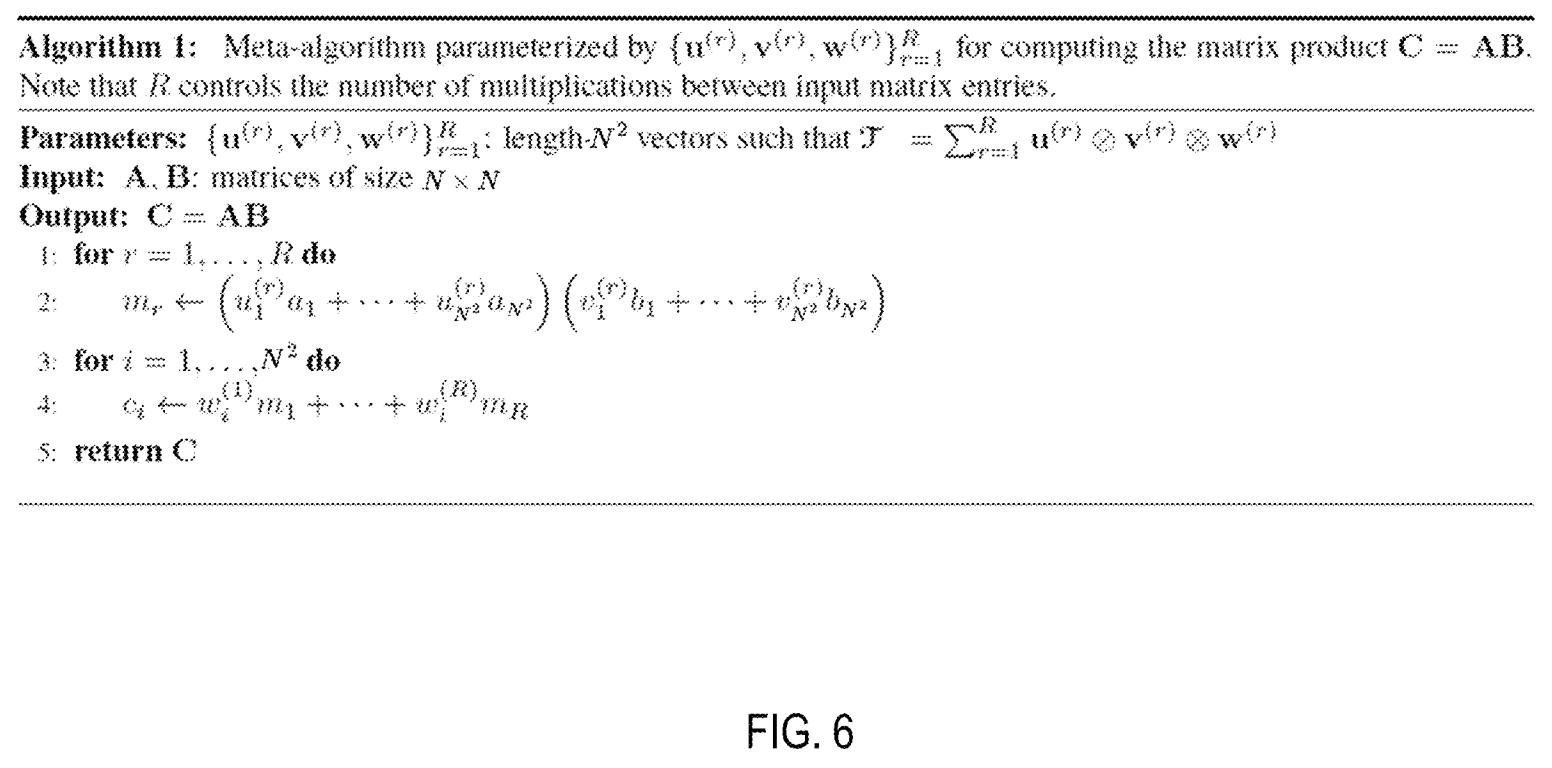

Algorithm 1: Meta-algorithm parameterized by $\{\mathbf{u}^{(r)}, \mathbf{v}^{(r)}, \mathbf{w}^{(r)}\}_{r=1}^{R}$ for computing the matrix product $\mathbf{C} = \mathbf{AB}$. Note that $R$ controls the number of multiplications between input matrix entries.

Parameters: $\{\mathbf{u}^{(r)}, \mathbf{v}^{(r)}, \mathbf{w}^{(r)}\}_{r=1}^{R}$: length-$N^2$ vectors such that $\mathcal{T} = \sum_{r=1}^{R} \mathbf{u}^{(r)} \otimes \mathbf{v}^{(r)} \otimes \mathbf{w}^{(r)}$

Input: $\mathbf{A}, \mathbf{B}$: matrices of size $N \times N$

Output: $\mathbf{C} = \mathbf{AB}$

1: for $r = 1, \ldots, R$ do

2: $\quad m_r \leftarrow \left(u_1^{(r)} a_1 + \cdots + u_{N^2}^{(r)} a_{N^2}\right)\left(v_1^{(r)} b_1 + \cdots + v_{N^2}^{(r)} b_{N^2}\right)$ 3: for $i = 1, \ldots, N^2$ do

4: $\quad c_i \leftarrow w_i^{(1)} m_1 + \cdots + w_i^{(R)} m_R$

5: return $\mathbf{C}$

FIG. 6

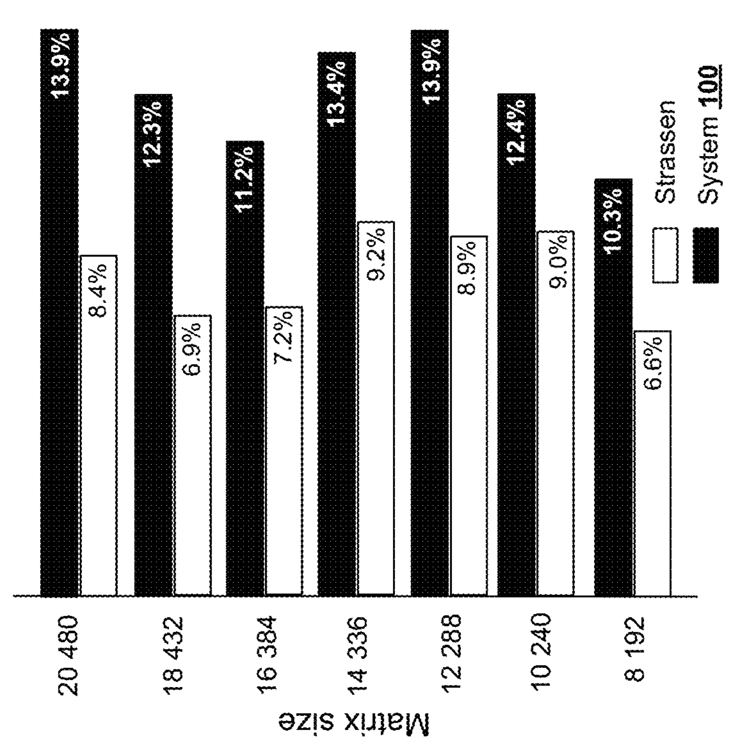
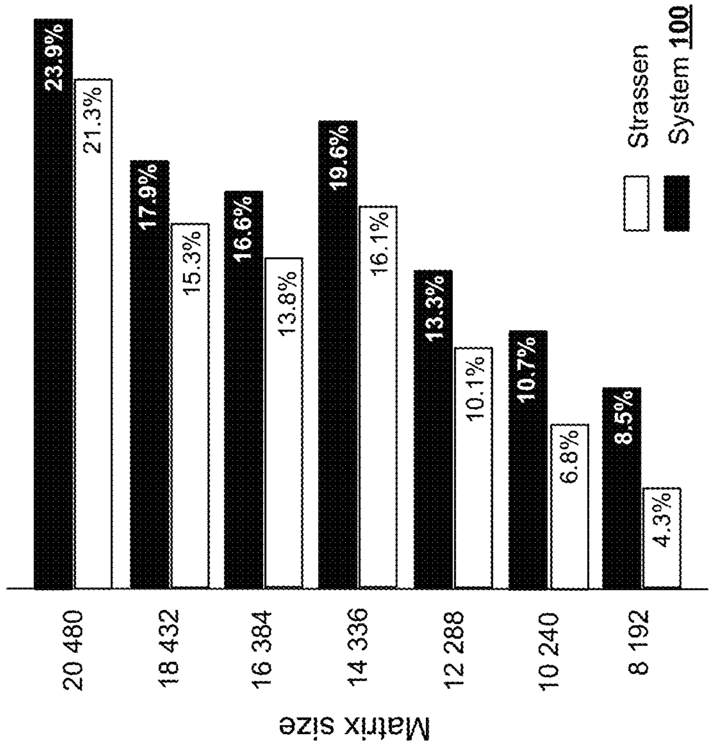
FIG. 7A

Speed-up (%) of tailored algorithms on both platforms

OPTIMIZING ALGORITHMS FOR HARDWARE DEVICES

BACKGROUND

This specification relates to optimizing multilinear algorithms for hardware devices using neural networks.

Multilinear maps, particularly bilinear maps (e.g., matrix multiplication), are fundamental computational tasks performed by various hardware devices, e.g., central processing units (CPUs), graphics processing units (GPUs), tensor processing units (TPUs), application-specific integrated circuits (ASICs), etc.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current value inputs of a respective set of parameters.

SUMMARY

This specification describes a method performed by one or more computers for obtaining an optimized algorithm that (i) is functionally equivalent to a target algorithm and (ii) optimizes one or more target properties when executed on a target set of one or more hardware devices.

The method includes: initializing a target tensor representing the target algorithm; generating, using a neural network having a plurality of network parameters, a tensor decomposition of the target tensor that parametrizes a candidate algorithm, where the neural network is configured to receive a state of a tensor as input and process the input in accordance with the network parameters to generate a network output including a policy for applying modifications to the tensor, where generating the tensor decomposition includes: for each step in a sequence of steps: obtaining a current state of the target tensor; determining a target network output for the current state by performing a tree search of a state tree having nodes representing states of the target tensor starting from a root node that represents the current state, where the tree search is guided by the neural network in accordance with the network parameters; applying a modification to the current state of the target tensor using the target network output for the current state; and determining whether to terminate the sequence based, at least in part, on whether the target tensor equals a zero tensor after the modification is applied; and generating the tensor decomposition from the modifications applied to the target tensor at each step in the sequence of steps; generating target property values for each of the target properties when executing the candidate algorithm on the target set of hardware devices; determining a benchmarking score for the tensor decomposition based on the target property values of the candidate algorithm; generating a training example from the tensor decomposition and the benchmarking score; and storing, in a training data store, the training example for use in updating the network parameters of the neural network.

The method can include: selecting, as the optimized algorithm, a particular candidate algorithm generated by using the neural network based on a benchmarking score for the particular candidate algorithm.

In some implementations, the policy can define a probability distribution over possible rank-one terms to be subtracted from the tensor.

In some implementations, the network output can include a return output defining an estimated return resulting from the tensor being in the state. The estimated return can be an estimate of an expected benchmarking score of a tensor decomposition. The estimated return can be an estimate of an expected rank of a tensor decomposition.

In some implementations, performing the tree search can include: traversing edges connecting nodes of the state tree until a leaf node is reached based on action scores assigned to the edges, where edges represent possible modifications to be applied to the target tensor; processing, using the neural network in accordance with the network parameters, a state of the target tensor represented by the leaf node to generate a network output for the leaf node; expanding the state tree at the leaf node using a policy for the leaf node; and for each edge of the state tree that was traversed: incrementing a visit count of the edge; and updating an action score for the edge based on a value constructed from a return output for the leaf node.

In some further implementations, performing the tree search can include: storing, in a transposition table, one or more nodes encountered during the tree search; determining, while traversing edges, that a newly encountered node represents a same state of the target tensor as a previously encountered node stored in the transposition table; and in response, transposing the newly encountered node with the previously encountered node.

In some implementations, determining the target network output from the tree search can include: smoothing, using an adaptive temperature scheme, visit counts of edges of the root node if a total visit count of all edges of the root node is greater than a maximum total visit count.

In some implementations, determining the target network output from the tree search can include: ignoring edges of the root node that have action scores lower than an action score of an edge of the root node with a highest visit count.

In some implementations, initializing the target tensor can include performing a change of basis on the target tensor, and generating the tensor decomposition can include performing an inverse change of basis on the tensor decomposition.

The method can include: generating a set of tensor decompositions of one or more synthetic tensors, where a synthetic tensor is a randomly initialized tensor; generating a set of synthetic training examples from the set of tensor decompositions of synthetic tensors; and storing, in the training data store, the set of synthetic training examples for use in updating the network parameters of the neural network.

The method can include: retrieving, from the training data store, a training state of a tensor associated with a training target; processing the training state using the neural network in accordance with the network parameters to generate a training network output; determining a gradient with respect to the network parameters of an objective function that encourages the training network output to meet the training target for the training state; and updating the network parameters according to the gradient.

In some implementations, the optimized algorithm can be executed recursively on the target set of hardware devices.

In some implementations, the target algorithm can compute a bilinear map. The bilinear map can be matrix multiplication.

In some implementations, the target properties can include at least one of: computational complexity of the optimized algorithm, runtime of the target set of hardware devices when executing the optimized algorithm, cache performance of the target set of hardware devices when executing the optimized algorithm, locality of reference of the optimized algorithm when executed on the target set of hardware devices, or power consumption of the target set of hardware devices when executing the optimized algorithm.

In some implementations, the target properties can include one or more of: runtime of the target set of hardware devices when executing the optimized algorithm, cache performance of the target set of hardware devices when executing the optimized algorithm, locality of reference of the optimized algorithm when executed on the target set of hardware devices, or power consumption of the target set of hardware devices when executing the optimized algorithm (without including the computational complexity of the optimized algorithm).

In some implementations, the target set of hardware devices can be a simulation of a set of hardware devices.

In some implementations, the target set of hardware devices can include at least one of: a central processing unit (CPU), a graphics processing unit (GPU), a tensor processing unit (TPU), or an application-specific integrated circuit (ASIC).

The method can include: receiving a new input; and performing the target algorithm on the new input by executing the optimized algorithm on the target set of hardware devices.

Particular embodiments of the subject matter described in this specification can be implemented so as to realize one or more of the following advantages.

The systems and methods disclosed in this specification can obtain optimized multilinear algorithms automatically using a neural network, e.g., algorithms that are optimized for a particular set of hardware devices. The result is superior performance of the hardware devices over existing algorithms as measured by any combination of performance metrics, e.g., reduced computational complexity, reduced runtime, reduced power consumption, improved cache metrics, increased locality of reference, etc. The automatic generation of efficient algorithms using the machine learning techniques disclosed herein can reach beyond the realm of human intuition and outperform human-designed algorithms.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 6 is an example of a matrix multiplication algorithm parametrized by a tensor decomposition.

FIGS. 7A-7C are experimental data showing matrix multiplication algorithms optimized for various hardware devices.

Like reference numbers and designations in the various drawings indicate like elements.

DETAILED DESCRIPTION

Figure 1:
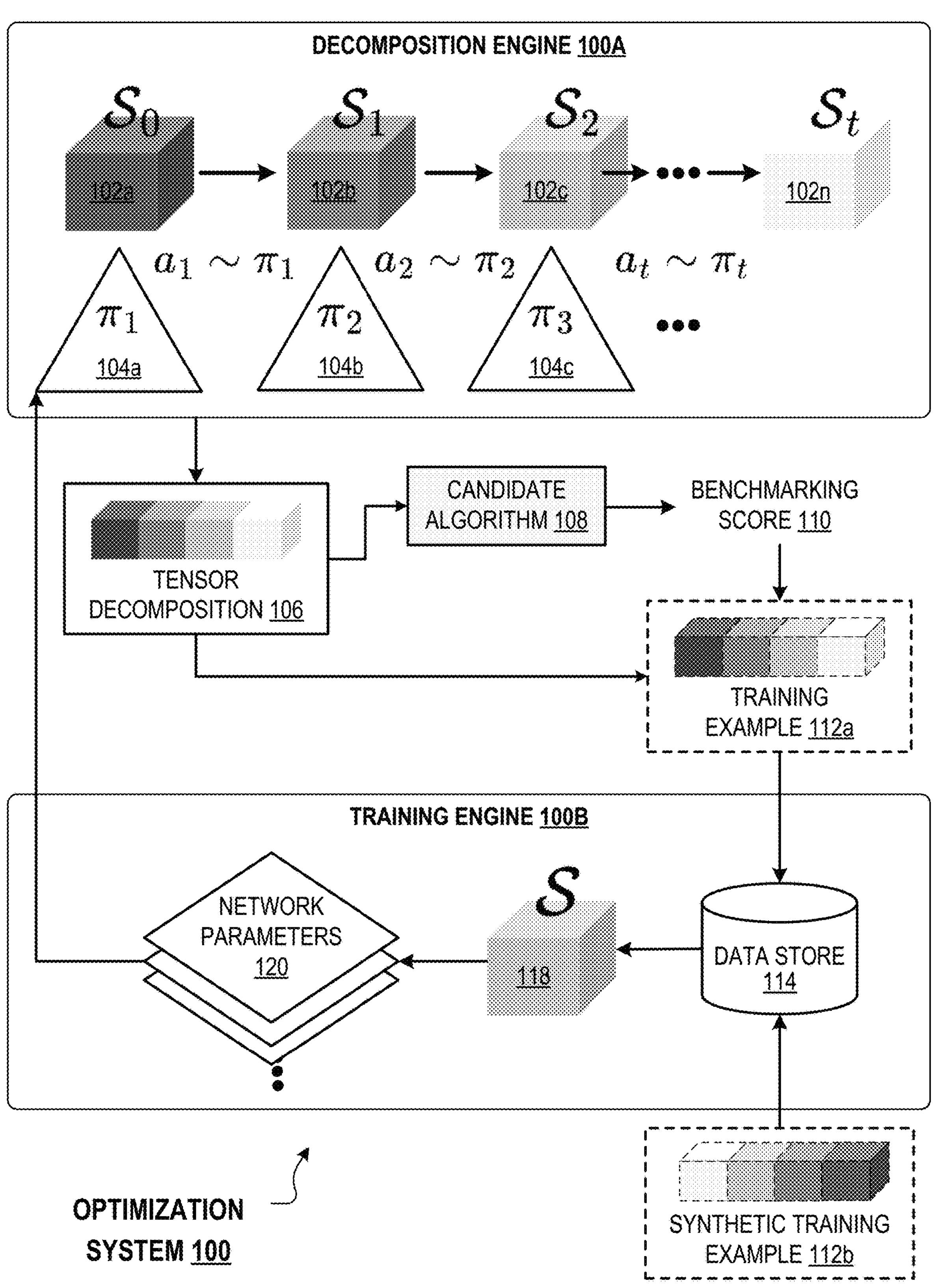
FIG. 1 shows an example optimization system.

FIG. 1 shows an example optimization system 100 that can automatically generate optimized algorithms for a set of hardware devices. The optimization system 100 is an example of a system implemented as computer programs on one or more computers in one or more locations in which the systems, components, and techniques described below are implemented.

The system 100 receives a target algorithm to optimize for a target set of one or more hardware devices, e.g., one or more of: a central processing unit (CPU), a graphics processing unit (GPU), a tensor processing unit (TPU), an application-specific integrated circuit (ASIC), etc. The target algorithm can describe any set of operations to be performed by the hardware devices, with the only stipulation being that the target algorithm can be represented as a tensor. Namely, the target algorithm can compute any multilinear map $f: X_1 \times \ldots \times X_n \rightarrow Y$, where $X_1, \ldots, X_n$ and Y are finite-dimensional vector spaces and $f$ is a function that implements the target algorithm.

Multilinear maps, particularly bilinear maps, are fundamental computational tasks that can manipulate vast amounts of data. Optimizing such ubiquitous tasks allows hardware devices to take full advantage of their computational resources. For example, GPUs and TPUs can execute bilinear maps efficiently due to their parallelized processing architecture, e.g., structured matrix multiplication, polynomial multiplication, convolutions, custom machine learning operations, etc. Yet, determining appropriate algorithms for their specific architectures has typically relied on human intuition and is therefore suboptimal. In contrast, the system 100 can generate the optimal algorithm, i.e., an algorithm that is optimized for a particular hardware architecture, automatically using a neural network trained via reinforcement learning with respect to one or more performance objectives of the hardware devices (e.g., as a weighted sum).

The performance objectives can be characterized by any number of target properties upon execution of the optimized algorithm on the hardware devices. The target properties can include an intrinsic measure of the computational complexity of the optimized algorithm. Alternatively or in addition, the target properties can include one or more parameters specific to the set of hardware devices (e.g., parameters which depend on the architecture of the hardware devices), and indicative of the performance of the optimized algorithm when implemented on the hardware devices, such as runtime, cache hit metrics, locality of reference, power consumption, etc. As will be described in more detail, the system 100 can benchmark these properties on-the-fly to train the neural network towards generating an algorithm that optimizes any combination of target properties in a manner specific to the set of hardware devices.

Furthermore, the system 100 can generate optimized algorithms that are functionally equivalent to the target algorithm. In this case, "functionally equivalent" implies that for each and every possible input, the optimized algorithm computes the exact same corresponding output as the target algorithm. In other words, the optimized algorithms are provably correct and do not approximate the target algorithm. This can be a particularly advantageous quality when considering fundamental computational tasks since the optimized algorithms will accumulate no error when executed on the hardware devices. Note that the term "exact same" is used to mean exactly the same for a certain number of significant figures (e.g., a number of significant figures which is the number of digits in the multiplied values), since, in hardware implementations of multiplication operations, rounding errors may occur when two floating point values are multiplied. If the target algorithm includes a truncation step, so as to generate an output which encodes the function $f$ to a certain number of significant figures, the optimized algorithms may do so also.

For clarity, a brief review of multilinear maps is outlined below to demonstrate how a target tensor $\mathcal{T}$ can represent the target algorithm. The multilinear function $y=f(x_1, \ldots, x_n)$ maps variables in vector spaces $x_\alpha \in X_\alpha$ to the vector space $y \in Y$. Additionally, the function $f$ has the property of linearity in each variable $$x_\alpha, x'_\alpha \in X_\alpha$$

such that, $$f(x_1, \ldots, ax_\alpha + bx'_\alpha, \ldots, x_n) = af(x_1, \ldots, x_\alpha, \ldots, x_n) + bf(x_1, \ldots, x'_\alpha, \ldots, x_n)$$

Here, a and b are scalars. A multilinear map of a single variable is a linear map. A multilinear map of two variables is a bilinear map (e.g., matrix multiplication), and so on.

To implement the target algorithm, the hardware devices execute the function $f$ with respect to some vector basis. The basis dictates how the hardware devices index elements of the variables $x_\alpha$ when executing $f$. Although any vector basis can be implemented, in most cases, the vector spaces are represented by linear arrays since this is normally how computing devices index data structures. In particular, the variables of each vector space $X_\alpha$ can be represented as column vectors $x_\alpha=[x_{\alpha 1}\ x_{\alpha 2}\ \ldots]^T \in X_\alpha$, where $\{x_{\alpha j_\alpha}\}$ are scalar elements of the variables. However, the elements $\{x_{\alpha j_\alpha}\}$ themselves can be associated with matrices, or tensors in general. For example, $x_\alpha$ can contain the elements of a matrix in row-major order layout or column-major order layout. This basis provides a very convenient and powerful framework to implement arbitrary multilinear algorithms and is therefore adopted in the description of algorithms herein.

Accordingly, a "canonical" basis of orthonormal unit vectors $\{e_{\alpha j_\alpha}\}$ can be chosen for each vector space $X_1, \ldots, X_n$, as well as the basis $\{g_k\}$ for Y. The unit vectors can be expressed as column vectors with a single entry of 1 and the rest 0, $$e_{\alpha 1} = \begin{bmatrix} 1 \\ 0 \\ \vdots \end{bmatrix}, e_{\alpha 2} = \begin{bmatrix} 0 \\ 1 \\ \vdots \end{bmatrix}, \ldots$$

As such, the variables of each vector space can be expanded with respect to the unit vectors as $x_\alpha=\Sigma_{j_\alpha} x_{\alpha j_\alpha} e_{\alpha j_\alpha}$ and $y=\Sigma_k y_k g_k$. Note that the number of unit vectors in each basis depends on the dimension of their respective vector space. Each vector space can have arbitrary dimension. Using the aforementioned linearity property, the function $f$ can be parametrized in this basis as, $$y = f(x^{(1)}, \ldots, x^{(n)}) = \sum_{j_1 \ldots j_n} x_{1j_n} \ldots x_{nj_n} f(e_{1j_1}, \ldots, e_{nj_n}) = \sum_{j_1 \ldots j_n k} \mathcal{T}_{j_1 \ldots j_n k} x_{1j_n} \ldots x_{nj_n} g_k$$

In this case, parametrization means the function $f$ is executed with respect to the indices $j_1, \ldots, j_n$ and k. The collection of tensor components $\{\mathcal{T}_{j_1 \ldots j_n k}\}$ define the target tensor $\mathcal{T}$. The target tensor $\mathcal{T}$ completely specifies the multilinear function $f$ in the chosen basis. In particular, the components $\{\mathcal{T}_{j_1 \ldots j_n k}\}$ are independent of $\{x_{\alpha j_\alpha}\}$ and related to $f$ through the parametrization $$\mathcal{T}_{j_1 \ldots j_n k} = g_k \cdot f(e_{1j_1}, \ldots, e_{nj_n})$$

Here, • represents the dot product. The target tensor $\mathcal{T}$ is generally of order D=n+1, corresponding to D different indices, where n is the number of variables entering the multilinear map. The size $N_1 \times \ldots \times N_n \times N$ of the target tensor $\mathcal{T}$ depends on the dimension $N_\alpha$ of each vector space $X_\alpha$, as well as the dimension N of Y.

The elements $y_k$ of the output vector y are expressed concisely as $$y_k = \sum_{j_1 \ldots j_n} \mathcal{T}_{j_1 \ldots j_n k} x_{1j_n} \ldots x_{nj_n}$$

Each $y_k$ is computed as a summation of products of the elements $\{x_{\alpha j_\alpha}\}$, scaled by the tensor components $\{\mathcal{T}_{j_1 \ldots j_n k}\}$. The hardware devices can implement the target algorithm by performing nested loops through $j_1, \ldots, j_n$ to compute each product and then computing the corresponding summation of products for each $y_k$. All such computations are represented compactly in the target tensor $\mathcal{T}$. Consequently, the target tensor $\mathcal{T}$ is a tensor representation of the target algorithm.

As a concrete example of a bilinear map, consider matrix multiplication of matrices A and B of sizes N×N to produce a matrix C=AB of the same size. To implement an algorithm for matrix multiplication, the elements of each matrix can be stored in linear arrays, e.g., in row-major or column-major order, $a=\Sigma_i a_i e_i$, $b=\Sigma_i b_i e_i$, and $c=\Sigma_i c_i e_i$. In this case, $\{e_i\}$ is a $N^2$ set of unit vectors that form an orthonormal basis for vectors spaces of dimension $N^2$. Hence, the elements $\{a_i\}$, $\{b_i\}$ and $\{c_i\}$ correspond to each element in their respective matrices A, B and C. A bilinear function m implements an algorithm for square matrix multiplication by taking a and b as inputs and computing the corresponding result in c=m(a, b). Utilizing the recipe described above, each $c_i$ can be expressed as a linear combination of multiplications between $\{a_i\}$ and $\{b_i\}$ $$c_k = \sum_{ij} \mathcal{M}_{ijk} a_i b_j$$

The collection of tensor components $\{\mathcal{M}_{ijk}\}$ have values in {0, 1} and define a "matrix multiplication tensor" $\mathcal{M}$ of order D=2+1=3 with size $N^2 \times N^2 \times N^2$. The components of $\mathcal{M}$ are independent of $\{a_i, b_i\}$ and related to the bilinear function m through the parametrization $$\mathcal{M}_{ijk} = e_k \cdot m(e_i, e_j)$$

Consequently, the matrix multiplication tensor $\mathcal{M}$ is a tensor representation of a matrix multiplication algorithm. An analogous procedure holds for any bilinear map, or multilinear map in general.

Nevertheless, a particular algorithm represented by a particular tensor may be suboptimal. For instance, the matrix multiplication tensor $\mathcal{M}$ has cubic computational complexity $\Theta(N^3)$ as it involves $N^3$ multiplications between the elements of A and B, but this amount of multiplications is unnecessary. Taking N=2 as an example, the system 100 can construct optimized algorithms (e.g., Strassen's algorithm) that involve only 7 multiplications, as opposed to 8. Reducing the number of multiplications in an algorithm can be an effective means of improving performance of a set of hardware devices, since multiplications are typically more computationally expensive than additions.

The system 100 generates an optimized algorithm by re-parametrizing the target tensor $\mathcal{T}$, and therefore the target algorithm, by way of a tensor decomposition. System 100 obtains the tensor decomposition by factorizing the target tensor $\mathcal{T}$ into a linear combination of R rank-one terms $\mathcal{X}^{(r)}$, $$\mathcal{T} = \sum_{r=1}^{R} \mathcal{X}^{(r)}$$

As their name implies, the rank of each rank-one term is rank[$\mathcal{X}^{(r)}$]=1, which places constraints on their allowable forms. A tensor decomposition with R rank-one terms is referred to as a rank-R decomposition. Accordingly, the rank of the target tensor $\mathcal{T}$ is said to be at most R, or rank[$\mathcal{T}$]≤R. Note that the rank of a tensor should not be confused with its order D, as these are two different but related quantities. The rank of a tensor depends on its size and denotes the number of linearly independent directions it can represent in a tensor product space. In other words, the rank is a measure of the "non-degenerateness" of a tensor. For example, an order D=2 tensor (i.e., a matrix) of size N×M has a maximum rank bounded by R≤min(N, M). An order D=3 tensor of size N×M×P has a maximum rank bounded by R≤min (NM, NP, MP), and so on.

A rank-one term $\mathcal{X}^{(r)}$ represents a single linearly independent direction in the tensor product space and therefore can always be expressed as an outer (tensor) product ⊗ of D=n+1 vector factors, $$\mathcal{X}^{(r)} = u_1^{(r)} \otimes \ldots \otimes u_n^{(r)} \otimes w^{(r)}$$

Each factor $$u_1^{(r)}, \ldots, u_n^{(r)} \text{ and } w^{(r)}$$

represents a single direction in the vector spaces of $X_1, \ldots, X_n$ and Y. The combination of which is a single linearly independent direction in the tensor product space $X_1 \otimes \ldots \otimes X_n \otimes Y$.

The system 100 parametrizes optimized algorithms with respect to the set factors $$\{u_1^{(r)}, \ldots, u_n^{(r)}, w^{(r)}\}_{r=1}^{R}$$

in the tensor decomposition. That is, each element $y_k$ of the output vector y can be computed as $$y_k = \sum_{j_1 \ldots j_n} \sum_{r=1}^{R} u_{1j_1}^{(r)} \ldots u_{nj_n}^{(r)} x_{1j_n} \ldots x_{nj_n} w_k^{(r)} = \sum_{r=1}^{R} m_r w_k^{(r)}$$

Where, $$m_r = \omega_1^{(r)} \ldots \omega_n^{(r)}, \omega_\alpha^{(r)} = \sum_{j_\alpha} u_{\alpha j_\alpha}^{(r)} x_{\alpha j_\alpha} = u_\alpha^{(r)} \cdot x_\alpha$$

The hardware devices can implement an optimized algorithm by looping over index r=1, . . . , R to compute each product $m_r$ and then computing the corresponding summation of products for each $y_k$. In this case, the loop over r replaces the nested loops over $j_1, \ldots, j_n$, enabling a more computationally efficient algorithm. As seen in the above equation, the rank of the decomposition R governs the computational complexity Θ(R), i.e., the number of products $m_r$, meaning low-rank decompositions are generally desirable. The specific form of the factors $$\{u_1^{(r)}, \ldots, u_n^{(r)}, w^{(r)}\}_{r=1}^{R}$$

controls the density of the decomposition, i.e., the number of additions. A target tensor $\mathcal{T}$ with low-rank decompositions implies the target algorithm has many redundant operations (it is highly degenerate). The system 100 aims to eliminate such redundancies.

FIG. 6 shows an example of an optimized matrix multiplication algorithm that can be obtained by the optimization system 100. Here, the matrix multiplication tensor $\mathcal{T} = \mathcal{M}$ is re-parametrized by factors $$u_1^{(r)} = u^{(r)}, u_2^{(r)} = v^{(r)} \text{ and } w^{(r)}.$$

As seen in FIG. 6, the number of multiplications between elements of the input matrices, A and B, is controlled by R. As such, decompositions with $R<N^3$ correspond to square matrix multiplication algorithms with reduced computational complexity. Algorithms of the form shown in FIG. 6 can be used to multiply block matrices, e.g., 2048×2048 sized submatrices of 8192×8192 matrices can be multiplied with 4×4 algorithms. Furthermore, the algorithms of FIG. 6 can be executed recursively on a set of hardware devices to multiply matrices of arbitrary size, i.e., M×M sized matrices can be multiplied with computational complexity $\Theta(M^{\log_N R})$.

Therefore, low-rank decompositions of smaller sized matrix multiplication tensors can be exploited to efficiently multiply much larger matrices.

FIG. 1 illustrates how the system 100 generates tensor decompositions of $\mathcal{T}$ from the neural network using a decomposition engine 100A, while simultaneously training the neural network on the decompositions using a training engine 100B. These processes can be performed sequentially or in parallel to automatically converge to low-rank tensor decompositions. Note, finding low-rank decompositions of tensors is NP-hard and is a hard computational task in practice, a task that has often relied on human-designed heuristics. The system 100 provides an autonomous means of overcoming the tensor decomposition problem, along with optimizing generic multilinear algorithms for any set of hardware devices.

After finding an optimized algorithm for a target set of hardware devices, the system 100 can substitute the target algorithm with the optimized algorithm. That is, all new inputs received by the set of hardware devices, that involve operations performed by the target algorithm, can instead be executed by the optimized algorithm. The result is superior performance of the devices, as measured by any combination of one or more target properties (i.e., a combination defined by weights of a weighted sum), e.g., reduced complexity, reduced runtime, reduced power consumption, improved cache metrics, etc. These improvements over existing algorithms can lead to significant impact since multilinear maps (e.g., einsum operations) become bottlenecks for many systems (e.g., training large language models). As the number of specialized hardware devices soars (as it is expected to for the foreseeable future), such tailored algorithms will become increasingly pervasive. The system 100 can provide even higher gains if both algorithm and hardware design are optimized jointly.

Along similar lines, system 100 can also send data specifying the optimized algorithm, e.g., the set of parametrizing factors $$\{u_1^{(r)}, \ldots, u_n^{(r)}, w^{(r)}\}_{r=1}^{R},$$

to a different set of hardware devices to implement the optimized algorithm in place of the target algorithm. For example, if the system 100 obtains an optimized matrix multiplication algorithm for a GPU in a GPU cluster, system 100 can send data specifying the optimized algorithm to all GPUs in the cluster. The performance enhancements achieved on one device is scalable since optimized algorithms can be implemented on any other device with the same (or similar) processing architecture.

Referring now to the neural network employed by the system 100. The neural network, parametrized by network parameters θ 120, is configured to receive a state of a tensor $\mathcal{S}$ as input and process the state to generate a network output $F_\theta(\mathcal{S})=(p, z)$. The network output includes a policy $p(\cdot|\mathcal{S})$ for applying modifications (i.e., actions) to $\mathcal{S}$ to produce a modified tensor $\mathcal{S}'$. The policy defines actions a, from a set of actions, that can be applied as modifications to $\mathcal{S}$ in order to produce $\mathcal{S}'$. In general, the policy $p(\cdot|\mathcal{S})$ provides a distribution over D=n+1 possible factors $(u_1, \ldots u_n, w)$ that can be combined into possible rank-one terms $\mathcal{X}=u_1\otimes \ldots \otimes u_n\otimes w$. An action $a\sim p(\cdot|\mathcal{S})$ thus corresponds to a selection of D=n+1 factors and subtracting the resulting rank-one term from $\mathcal{S}$, such that $\mathcal{S}'=\mathcal{S}-\mathcal{X}$.

The network output can also include a return output $z(\cdot|\mathcal{S})$. In general, the return output $z(\cdot|\mathcal{S})$ provides a distribution over an expected benchmarking score for the tensor being in the state $\mathcal{S}$. However, the return output can instead be a regressed value, e.g., an expected benchmarking score corresponding to the mean of the distribution. That being said, modelling a distribution generally offers improved performance and flexibility for the system 100 since high variability in benchmarking scores can be captured.

A benchmarking score 110 characterizes performance objectives when executing a candidate algorithm 108, parametrized by a tensor decomposition 106, on a target set of hardware devices. As will be discussed in more detail below, the benchmarking score 110 is a numerical value that assigns a relative score to the tensor decomposition 106.

In some implementations, the return output $z(\cdot|\mathcal{S})$ provides a distribution over an expected rank of a tensor decomposition 106. In this case, the expected rank acts as a proxy measure of the benchmarking score 110 without actually executing the candidate algorithm 108 on the hardware devices. This is because the rank R of the tensor decomposition 106 is a direct measure of the computational complexity Θ(R) of the candidate algorithm 108. Hence, when complexity alone is being optimized, the system 100 does not need to reference any specific set of hardware devices and will tend to converge to low-rank tensor decompositions.

Generally, the neural network included in the optimization system 100 can have any suitable architecture to enable its desired functions. In particular, the neural network can include any appropriate neural network layers (e.g., fully-connected layer, convolutional layers, attention layers, etc.) in any appropriate numbers (e.g., 5, 10, or 100 layers) and arranged in any appropriate configuration (e.g., as a linear sequence of layers).

A high level overview of the optimization system 100 is outlined below. Details of each process involved will be elaborated in relation to FIGS. 2-5.

The decomposition engine (DE) 100A sets an initial state of a tensor $\mathcal{S}_0$ to the target tensor $\mathcal{S}_0=\mathcal{T}$, then performs a sequence of steps to generate a tensor decomposition 106. The tensor after each step t is described by a state $\mathcal{S}_t$ 102*a-n*. At each step of the sequence, DE 100A selects an action $a_t$ and the current state $\mathcal{S}_{t-1}$ is updated according to $a_t$. The action $a_t$ corresponds to a selection of factors $$(u_1^{(t)}, \ldots u_n^{(t)}, w^{(t)})$$

and the current state is modified $\mathcal{S}_t\leftarrow\mathcal{S}_{t-1}-\mathcal{X}^{(t)}$ by subtracting the resultant rank-one term $$\mathcal{X}^{(t)} = u_1^{(t)}\otimes \ldots \otimes u_n^{(t)}\otimes w^{(t)}.$$

To determine appropriate actions $a_t$, DE 100A performs a tree search 104*a-n* of a state tree at each step, e.g., a Monte-Carlo Tree Search (MCTS). The tree search is guided by the neural network, in accordance with the network parameters θ 120, to determine a suitable action $a_t$ for the step.

DE 100A applies an action $a_t$ at each step t until the tensor reaches a zero tensor $\mathcal{S}_T=0$ at a terminal step t=T. After which, all factors $$\{u_1^{(t)}, \ldots u_n^{(t)}, w^{(t)}\}_{t=1}^T$$

selected by DE 100A are consolidated into a tensor decomposition 106 that parametrizes a candidate algorithm 108. The total number of steps in the sequence T=R is equal to the rank of the decomposition 106, as well as the computational complexity Θ(T) of the candidate algorithm 108. Moreover, it follows that the sequence of selected factors satisfies $$\mathcal{T} = \sum_{t=1}^{T} \mathcal{X}^{(t)},$$

which guarantees the correctness of the candidate algorithm 108. To avoid possibly infinite sequences, the system 100 can limit the number steps to a maximum value, after which the sequence is terminated. For example, the maximum value can be an upper bound on the maximum rank of the target tensor $\mathcal{T}$. In some cases, the system 100 assigns a penalty score to incomplete decompositions in order to train the neural network away from such action sequences.

The system 100 benchmarks the candidate algorithm 108 on-the-fly by executing the candidate algorithm 108, potentially multiple times, on the set of hardware devices. For example, the system 100 can execute the candidate algorithm 108 numerous times with randomly initialized inputs and then average the performance metrics. Alternatively or in addition, the system 100 can execute the candidate algorithm 108 on a simulation of the hardware devices which can perform multiple executions in parallel.

The system 100 then obtains a benchmarking score 110 that characterizes target properties for the hardware devices executing the candidate algorithm 108, e.g., computational complexity, locality of reference, runtime, cache hit metrics, power consumption, etc. The benchmarking score 110 is a numerical value that appropriately weighs combinations (i.e., according to weights of a weighted sum) of target property values of the target properties being optimized. For example, the target property values can include any of the rank R=T, the number of local memories referenced, the average runtime, the average cache hit ratio, the average energy consumed, etc. System 100 is flexible as it supports complex stochastic and non-differentiable benchmarking scores 110. In some implementations, the benchmarking score 110 strictly includes the rank R=T of the tensor decomposition 106, in which case the candidate algorithm 108 does not need to be executed on any specific set of hardware devices. The system 100 then optimizes strictly for low-rank decompositions, i.e., minimizing computational complexity. More preferably, the benchmarking score is based (in addition or instead) on one of more of the target properties which are specific to the set of hardware devices and indicative of the corresponding performance of the candidate algorithm 108 by the set of hardware devices.

The system 100 generates a training example 112*a* from the tensor decomposition 106 and benchmarking score 110 that are stored in a training data store 114. The benchmarking score 110 can reinforce tensor decompositions 106 that have achieved relatively good scores, e.g., low ranks and/or runtimes. Alternatively or in addition, the system 100 can generate synthetic training examples 112*b* and add them to the data store 114. Synthetic training examples 112*b* correspond to tensor decompositions of randomly initialized synthetic tensors $\mathcal{D}$. Supervised learning can train the network to imitate decompositions of the synthetic dataset.

Sequentially, or in parallel with DE 100A, the training engine (TE) 100B randomly samples a training tensor state $\mathcal{S}$ 118 from the training data store 114. TE 100B uses the training state $\mathcal{S}$ 118 to update the network parameters θ 120 of the neural network. The training state $\mathcal{S}$ 118 can originate from either a training example 112*a* or a synthetic training example 112*b*. In the former case, the neural network is trained via reinforcement learning. In the latter case, the neural network is trained via supervised learning. A mixed training strategy, where the neural network is trained on tensor decompositions of the target tensor $\mathcal{T}$ as well as synthetic tensors $\mathcal{D}$, can significantly outperform each training strategy separately. This is despite $\mathcal{D}$ having very different properties from $\mathcal{T}$. TE 100B can continuously sample training states $\mathcal{S}$ 118 to continuously update the network parameters θ 120.

The updated neural network can be utilized by DE 100A to obtain improved tensor decompositions 106 which are subsequently benchmarked and used as training examples 112*a* for TE 100B. This process can repeat until the system 100 converges on an optimizer a candidate algorithm 108 with the best attainable benchmarking score 110 (relative to a baseline benchmarking score for the target algorithm) in which case the candidate algorithm 108 is optimized.

In other words, the system can continue updating the neural network while generating candidate algorithms until a termination criterion is satisfied. Once the termination criterion is satisfied, the system can select the most recently generated candidate or the candidate with the best benchmarking score as the optimized algorithm. For example, the criterion can be satisfied when the benchmarking score 110 meets some threshold value, the benchmarking score 110 changes negligibly relative to previous scores stored in the data store 114, a threshold number of candidate have been generated, a threshold amount of wall clock time elapses, and so on. Note, the system 100 may acquire multiple optimized algorithms that perform equally well on the set of hardware devices, i.e., they have equivalent benchmarking scores. The system 100, or a user, can select any of these optimized algorithms to implement the target algorithm.

Figure 2:
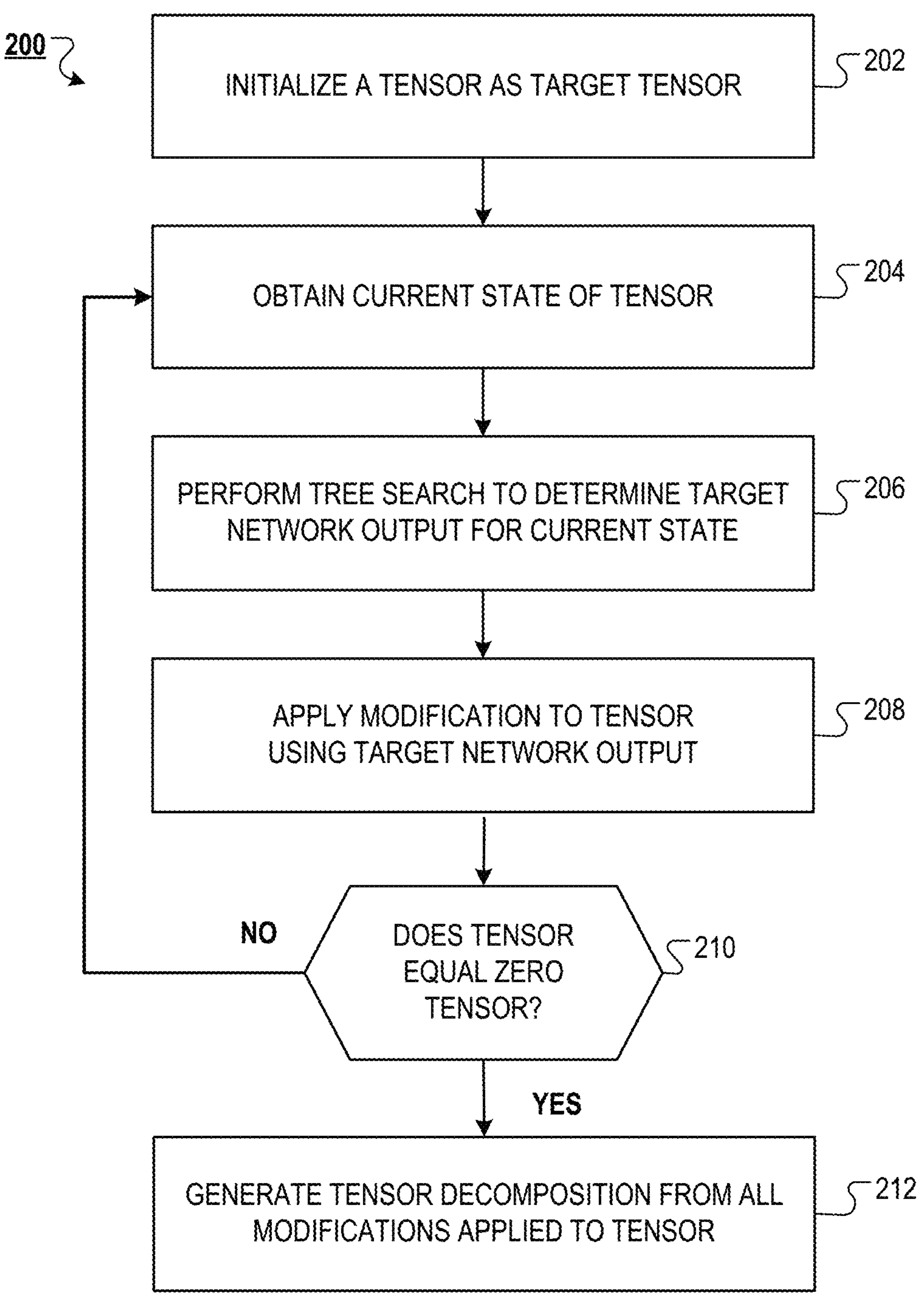
FIG. 2 is a flow diagram of an example process for generating a tensor decomposition.

FIG. 2 is a flow diagram of an example process 200 for generating a tensor decomposition 106 of the target tensor $\mathcal{T}$. For convenience, the process 200 will be described as being performed by a system of one or more computers located in one or more locations. For example, a decomposition engine, e.g., the decomposition engine 100A of FIG. 1, appropriately programmed in accordance with this specification, can perform the process 200.

The decomposition engine (DE) initializes a tensor $\mathcal{S}_0=\mathcal{T}$ as the target tensor (202). In some implementations, DE performs a change of basis $\mathcal{T} \to \mathcal{T}'$ before initializing $\mathcal{S}_0$. This can be accomplished with the following transformation on tensor components $$\mathcal{T}'_{j_1 \ldots j_n k} = \sum_{i_1 \ldots i_n l} A^1_{j_1 i_1} \ldots A^n_{j_n i_n} B_{kl} \mathcal{T}_{i_1 \ldots i_n l}$$

Where $A^1, \ldots, A^n$ and B are D=n+1 invertible matrices defining the new basis. The resulting decomposition can be converted back to the original (canonical) basis by performing an inverse change of basis on the recovered set of factors. This procedure injects diversity into the system 100 which can aid the neural network both in decomposing tensors and learning from tensor decompositions. DE can randomly sample bases and perform decompositions in all such bases in parallel. For numerical stability, all basis matrices can be unimodular with determinants of ±1.

An integer index t is set to an initial value of t=1.

The DE obtains a current state $\mathcal{S}_{t-1}$ of the tensor (204). In the case of t=1, this amounts to obtaining the $\mathcal{S}_0$ generated in step 202.

The DE performs a tree search of a state tree to determine a target network output for the current state $\mathcal{S}_{t-1}$ (206). Specifics of the tree search are described in the following with respect to FIG. 3. The tree search, guided by the neural network, returns the target network output that includes an improved policy over actions $\pi(\cdot|\mathcal{S}_{t-1})$. The improved policy provides an improved distribution over possible factors $$(u_1^{(t)}, \ldots u_n^{(t)}, w^{(t)})$$

that can be combined into possible rank-one terms $$\mathcal{X}^{(t)} = u_1^{(t)} \otimes \ldots \otimes u_n^{(t)} \otimes w^{(t)}.$$

The DE applies a modification to the current tensor state $\mathcal{S}_{t-1}$ using the target network output for the current state (208). DE determines an appropriate action $a_t$ by sampling from the improved policy $a_t \sim \pi(\cdot|\mathcal{S}_{t-1})$. The action $a_t$ corresponds to a selection of factors $$(u_1^{(t)}, \ldots u_n^{(t)}, w^{(t)})$$

that modify the tensor from its current state $\mathcal{S}_t \leftarrow \mathcal{S}_{t-1} - \mathcal{X}^{(t)}$ by subtracting the resulting rank-one term $\mathcal{X}^{(t)}$.

The DE determines if the modified tensor equals a zero tensor $\mathcal{S}_t \overset{?}{=} 0$ (210). If the tensor does not equal the zero tensor $\mathcal{S}_t \neq 0$, the process 200 repeats from step 204. If the tensor does equal the zero tensor $\mathcal{S}_t = 0$, the process 200 proceeds to step 212.

After determining the tensor equals the zero tensor $\mathcal{S}_T = 0$ for a terminal iteration t=T, the DE generates the tensor decomposition 106 from all modifications applied to the tensor (212). That is, the DE consolidates all factors $$\{u_1^{(t)}, \ldots u_n^{(t)}, w^{(t)}\}_{t=1}^{T}$$

selected by the actions $a_1, \ldots, a_T$ to obtain the tensor decomposition $$\mathcal{T} = \sum_{t=1}^{T} \mathcal{X}^{(t)}.$$

Figure 3:
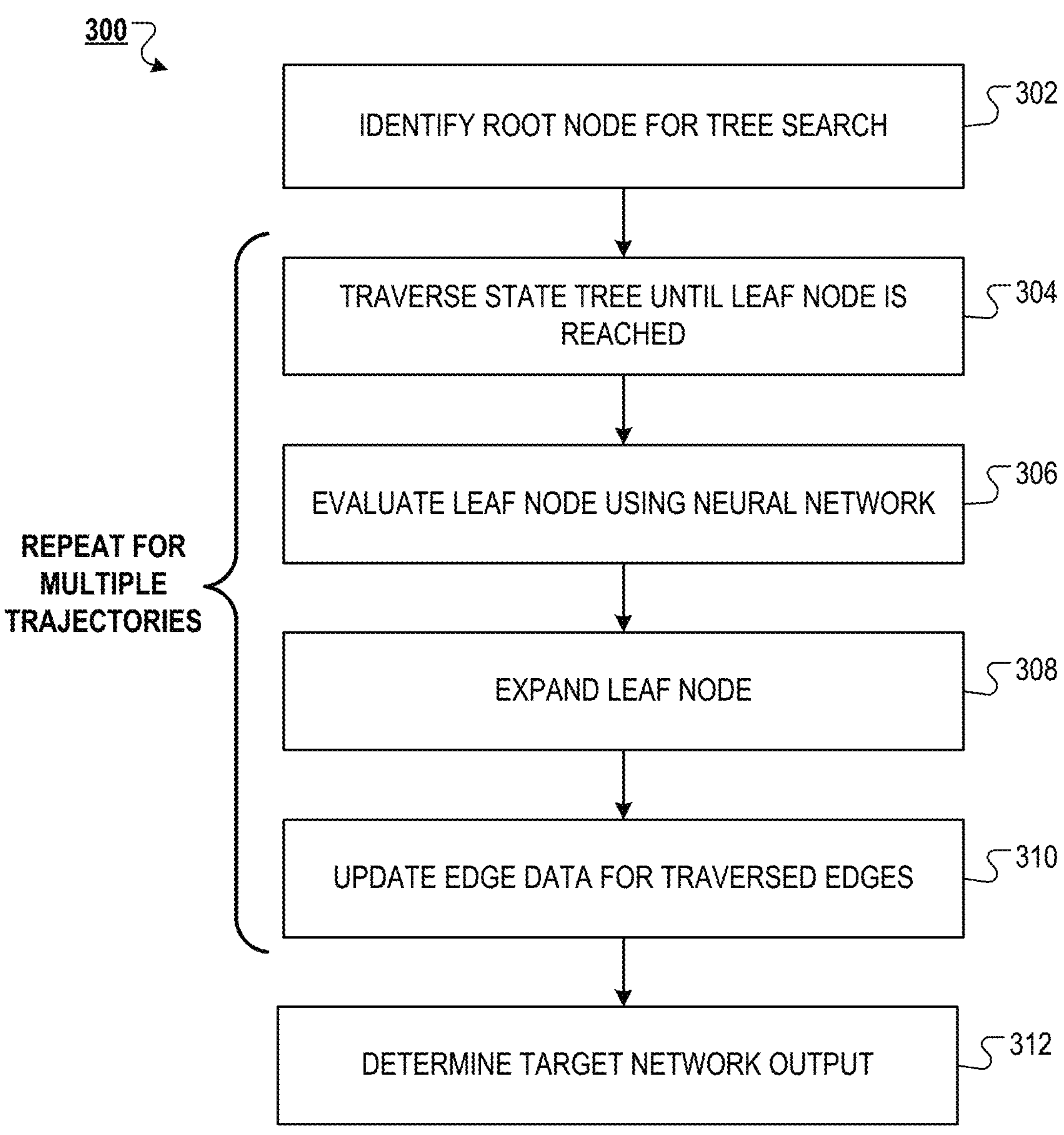
FIG. 3 is a flow diagram of an example process for performing a tree search.

FIG. 3 is a flow diagram of an example process 300 for performing a tree search of state tree to determine a target network output, e.g., a Monte-Carlo Tree Search (MCTS). For convenience, the process 300 will be described as being performed by a system of one or more computers located in one or more locations. For example, a decomposition engine, e.g., the decomposition engine 100A of FIG. 1, appropriately programmed in accordance with this specification, can perform the process 300, e.g., as part of performing step 206 of the method 200.

The state tree includes nodes representing states of a tensor $\mathcal{S}$, connected by directed edges representing actions a. Each state-action pair ($\mathcal{S}$, a) stores a set of edge statistics N($\mathcal{S}$, a), Q($\mathcal{S}$, a) and $\hat{\pi}(\mathcal{S}, a)$, corresponding to a visit count, action value and prior probability, respectively.

Detailed steps for conducting tree searches are provided by T. Hubert, J. Schrittwieser, I. Antonoglou, M. Barekatain, S. Schmitt and D. Silver, "Learning and planning in complex action spaces," in: *International Conference on Machine Learning* (*ICML*), 2021, which outlines a similar sampled-based MCTS for Sampled AlphaZero.

The DE identifies a root node representing a current state of a tensor $\mathcal{S}_{t-1}$ (302).

Starting from the root node, DE traverses the state tree until a leaf node representing a leaf state $\mathcal{S}_L$ is reached (304). The DE can traverse the state tree based on action scores assigned to the edges, e.g., by maximizing over the probabilistic upper confidence tree (PUCT) bound.

The DE evaluates the leaf node representing the leaf state $\mathcal{S}_L$ (306). The leaf state $\mathcal{S}_L$ is processed by the neural network $F_\theta(\mathcal{S}_L)=(p, z)$, in accordance with the network parameters θ, to generate a network output for the leaf node. The network output includes a policy $p(\cdot|\mathcal{S}_L)$ for the leaf node and can also include a return output $z(\cdot|\mathcal{S}_L)$ for the leaf node.

The DE expands the leaf node representing the leaf state $\mathcal{S}_L$ (308). The network output can be used to expand the state tree with new (child) nodes connected to the leaf node. The new nodes represent tensor states $\{\mathcal{S}_\lambda\}$. Specifically, a set of actions $\{a_\lambda\}$ can be determined from the policy for the leaf node $a_\lambda \sim p(\cdot|\mathcal{S}_L)$. Each action $a_\lambda$ is associated with a selection of factors $$(u_1^{(\lambda)}, \ldots u_n^{(\lambda)}, w^{(\lambda)})$$

and a resultant rank-one term $$\mathcal{X}^{(\lambda)} = u_1^{(\lambda)} \otimes \ldots \otimes u_n^{(\lambda)} \otimes w^{(\lambda)}.$$

The rank-one terms are subtracted from the leaf state $\mathcal{S}_L$ to generate the new nodes $\mathcal{S}_\lambda = \mathcal{S}_L - \mathcal{X}^{(\lambda)}$. Note, due to enormous action spaces, e.g., greater than $10^{12}$ for most cases of interest, the set of actions $\{a_\lambda\}$ are generally sampled from the policy and not completely enumerated. Hence, the system 100 samples a fixed number of actions $K \ll 10^{12}$ according to the policy for the leaf node with λ=1, . . . , K.

In some implementations, a value $v(\mathcal{S}_L)$ is constructed for the leaf node using the return output $z(\cdot|\mathcal{S}_L)$. The value can be the mean of the return output, i.e., the expected benchmarking score, but more generally, the value can be constructed to encourage certain behaviors of the tree search. For example, the value v can be a risk-seeking value, encouraging exploration, in order to find the best trajectory of the state tree. To accomplish this, the neural network can generate a return output composed of q outputs corresponding to quantiles $$\frac{1}{2q}, \frac{3}{2q}, \ldots, \frac{2q-1}{2q}.$$

In this way, the return output predicts the distribution of returns for a state in the form of values predicted for the aforementioned quantiles. To construct a risk-seeing value v, DE can use the average of the predicted values for quantiles over 75%. A review of quantile regression learning is provided by W. Dabney, M. Rowland, M. Bellemare and R. Munos, "Distributional reinforcement learning with quantile regression," in: *Proceedings of the AAAI Conference on Artificial Intelligence,* vol. 32, 2018.

The DE updates edge statistics data for all traversed edges (310). Upon a backward pass up the state tree, DE increments the visit counts and action values (e.g., using the value v) of all edges traversed during the trajectory down the tree.

DE performs consecutive trajectories from the root node until one or more criteria is satisfied, e.g., max time elapsed, max number of leaf nodes evaluated, etc. In addition, DE can use a transposition table to recombine different trajectories if they reach nodes representing the exact same state of a tensor. This can happen frequently since actions are generally commutative, i.e., changing the order of actions does not change the resulting state. In this case, a transposition table is a cache of frequently encountered nodes. If a node representing a particular state recurs via a different sequence of actions, DE can transpose the node with a previously encountered node (representing the same state) from the transposition table, avoiding re-evaluating the subtree below that node. This generally increases the quality of information gathered from the state tree.

After $N(\mathcal{S}_{t-1})$ trajectories from the root node, the DE determines a target network output for the current state $\mathcal{S}_{t-1}$ (312). The target network output includes a sampled-based improved policy over actions $\pi(\bullet|\mathcal{S}_{t-1})$. The improved policy can be determined from the normalized visit counts of the edges of the root node $\pi(a|\mathcal{S}_{t-1})=N(\mathcal{S}_{t-1}, a)/N(\mathcal{S}_{t-1})$, where $N(\mathcal{S}_{t-1}, a)$ are the visit counts of the edges of the root node. DE can then select an action $a_t$ using the improved policy $a_t \sim \pi(\bullet|\mathcal{S}_{t-1})$.

In some implementations, the subtree under the selected action $a_t$, i.e., the selected edge at the root node, is reused in the tree search for $\mathcal{S}_t$ in the following iteration.

In further implementations, the tree search uses an adaptive temperature scheme to smooth the normalized visit counts (i.e., to suppress relatively large values of $\pi(a|\mathcal{S}_{t-1})$), as some states can accumulate an order of magnitude more visits than others due to the transposition table and subtree reuse. For example, normalized counts can be smoothed using a function $\pi(a|\mathcal{S}_{t-1})=N^{\tau}(\mathcal{S}_{t-1}, a)/\Sigma_b N^{\tau}(\mathcal{S}_{t-1}, b)$, where the function is $\tau(\mathcal{S}_{t-1})=\log \bar{N}/\log N(\mathcal{S}_{t-1})$ if $\bar{N}<N(\mathcal{S}_{t-1})$ and 1 otherwise. Here, $\bar{N}$ is a hyper parameter representing a maximum total visit count of all edges of the root node.

In yet further implementations, when returning the improved policy to be used for action selection by DE, the tree search ignores edges of the root node that have action scores lower than the action score of the most visited edge.

Figure 4:
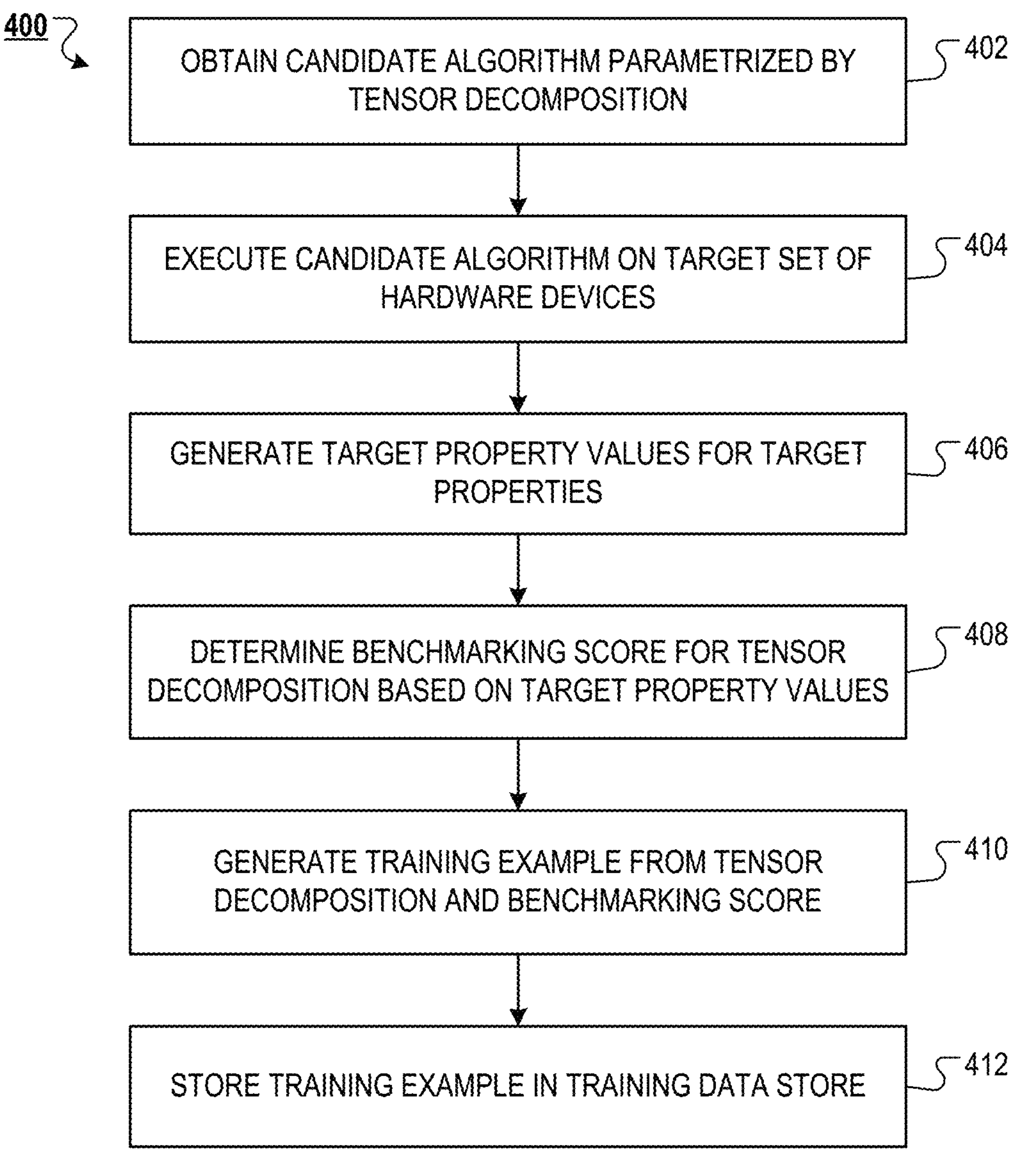
FIG. 4 is a flow diagram of an example process for generating training examples from tensor decompositions.

FIG. 4 is a flow diagram of an example process 400 for generating training examples from tensor decompositions. For convenience, the process 400 will be described as being performed by a system of one or more computers located in one or more locations. For example, an optimization system, e.g., the optimization system 100 of FIG. 1, appropriately programmed in accordance with this specification, can perform the process 400.

The system obtains a candidate algorithm parametrized by a tensor decomposition (402).

The system executes the candidate algorithm, potentially multiple times, on a target set of hardware devices (404). In some implementations, the candidate algorithm is executed on a simulation of the set of hardware devices, in which case many simulations can be run in parallel.

The system generates target property values for target properties of the hardware devices (406). The target properties characterize any number of performance objectives of the hardware devices, e.g., complexity, runtime, etc. The target property values assign numerical values to these properties. For example, target property values can include the rank R of the tensor decomposition and the average runtime B of the candidate algorithm executed on the hardware devices.

The system determines a benchmarking score for the tensor decomposition based on the target property values (408). The benchmarking score can weigh target property values, in a linear or nonlinear combination, to emphasize certain target properties. For example, the benchmarking score G can include the rank R and average runtime B of the candidate algorithm $G=-(R+\lambda B)$, where $\lambda>0$ is a user-specified coefficient that controls the relative emphasis of computational complexity vs. computational speed. In this case, a high benchmarking score corresponds to a combination of low complexity and fast runtimes.

The system generates a training example from the tensor decomposition and benchmarking score (410). The training example generally includes the state of the tensor $\mathcal{S}_t$ at each step in the sequence $t=1 \ldots T$ performed by the decomposition engine (DE) 100A. The training example also includes the target network output, i.e., the improved policy $\pi(\bullet|\mathcal{S}_{t-1})$, determined from the tree search at each step $t=1 \ldots T$.

The system stores the training example in a training data store for use in training the neural network via reinforcement learning (412). Training examples can be categorized in the data store relative to their benchmarking scores to reinforce tensor decompositions with the best relative scores. In some cases, this means discarding training examples that have poor scores and retaining training examples with acceptable scores. The system can extract additional training examples from the same tensor decomposition by reordering rank-one terms (as summation is commutative). In particular, the system can swap two actions at random to generate an additional training example. This helps the system explore actions it previously only discovered later in the decomposition sequence.

Alternatively or in addition, the system can incorporate synthetic training examples into the data store for use in training the neural network via supervised learning. The synthetic training examples include tensor decompositions of random tensors $\mathcal{D}$. The system can randomly sample factors $$\{u_1^{(r)}, \ldots u_n^{(r)}, w^{(r)}\}_{r=1}^{R}$$

to construct $$\mathcal{D}=\sum_{r=1}^{R}\mathcal{X}^{(r)}$$

from the corresponding rank-one terms $\mathcal{X}^{(r)}$. Hence, the factors constitute a tensor decomposition of $\mathcal{D}$ by definition. Since the forward process of obtaining random tensors $\mathcal{D}$ from rank-one terms $\mathcal{X}^{(r)}$ is elementary, the system can generate an arbitrarily large set of synthetic training examples.

By repeatedly performing the process 400 while training the neural network on training examples sampled from the training data store, the neural network will generate candidate algorithms with increasing benchmarking scores. Once a termination criterion for terminating the training has been satisfied, the system can select one of the candidate algorithms that have been generated using the process 400 as the optimized algorithm, e.g., by selecting the most recently generated candidate or by identifying the candidate algorithm that has the best benchmarking score among the candidates that have been generated.

Figure 5:
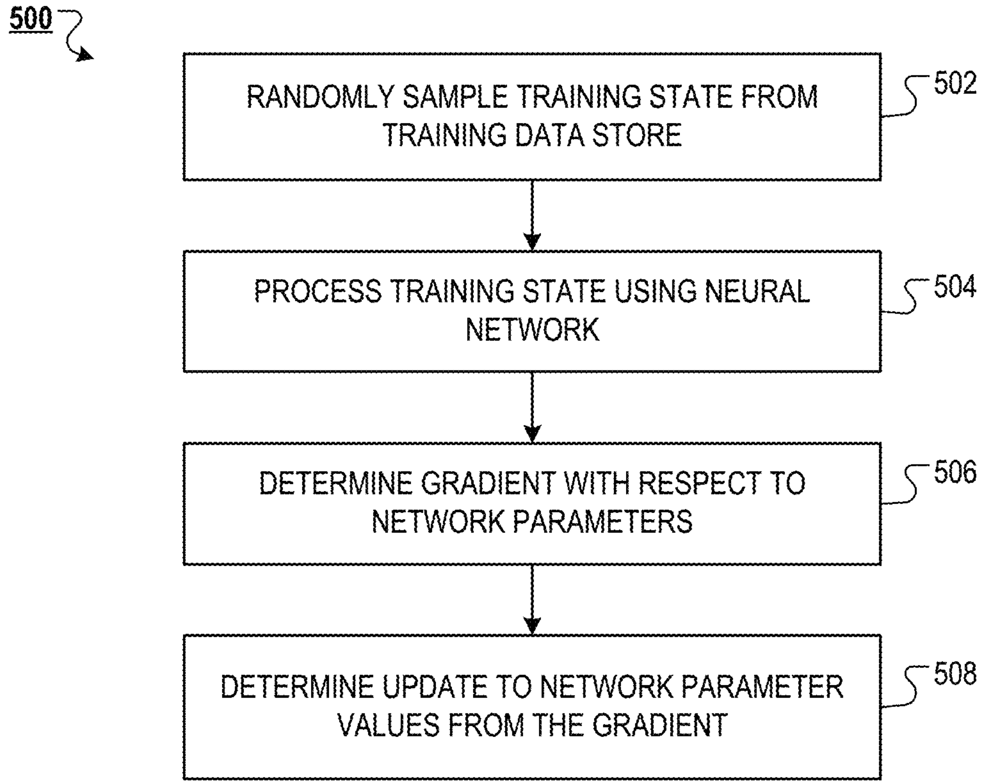
FIG. 5 is a flow diagram of an example process for updating network parameter values of a neural network.

FIG. 5 is a flow diagram of an example process 500 for updating network parameter values θ of a neural network. For convenience, the process 500 will be described as being performed by a system of one or more computers located in one or more locations. For example, a training engine, e.g., the training engine 100B of FIG. 1, appropriately programmed in accordance with this specification, can perform the process 500.

The training engine (TE) randomly samples a training state $\mathcal{S}$ from a training data store (502).

The TE processes the training state $\mathcal{S}$ using the neural network, in accordance with the network parameters θ, to generate a training network output $F_\theta(\mathcal{S})=(p, z)$ (504).

Each training state $\mathcal{S}$ is associated with a training target. If the training state $\mathcal{S}$ originated from a training example, the training target is to maximize the similarity between the training policy $p(\cdot|\mathcal{S})$ and the improved policy for the state $\pi(\cdot|\mathcal{S})$. To accomplish this, an objective function can include terms that measure a divergence loss (e.g., a Kullback-Leibler divergence loss) between p and π. In some implementations, the training target also aims to maximize the similarity between an estimated benchmarking score defined by the training return output $z(\cdot|\mathcal{S})$, compared with an actual benchmarking score for the state $\mathcal{S}$. For example, the objective function can include terms that measure a quantile regression distributional loss.

On the other hand, if the training state $\mathcal{S}$ originated from a synthetic training example, the training target is to maximize the similarity between the training policy $p(\cdot|\mathcal{S})$ and the next action a, i.e., the next rank-one term $\mathcal{X}$. That is, starting from the training state $\mathcal{S}$, the next action a is a specific choice of factors $(u_1, \ldots u_n, w)$ for the next rank-one term $\mathcal{X}=u_1\otimes \ldots \otimes u_n \otimes w$ that is subtracted from the state $\mathcal{S}'=\mathcal{S}-\mathcal{X}$. This corresponds to a certain step in the decomposition of the synthetic tensors. Since synthetic tensors $\mathcal{D}$ are constructed from known factors and rank-one terms, the next (best) action is known a priori. In this case, the objective function can include terms that measure the likelihood of the action given the state $p(a|\mathcal{S})$ which trains the neural network to mimic decompositions in the synthetic training data.

The TE determines a gradient of the objective function with respect to the network parameters θ (506).

The TE updates the network parameter values θ from the gradient of the objective function (508). For example, TE can use a stochastic gradient descent method, e.g., RMSprop, Adam with decoupled weight decay, etc. to update the network parameter values.

FIG. 7A and 7B show 8192×8192 sized matrix multiplication algorithms optimized for runtime for an NVidia V100 GPU and a TPU v2, respectively. That is, the system 100 acquires candidate algorithms for multiplying 4×4 matrices and benchmarks the candidate algorithms against runtime (and complexity) for computing 8192×8192 block matrices, where each block (submatrix) corresponds to 2048×2048 matrices. The optimized matrix multiplication algorithms are parametrized according to FIG. 6 and compared with Strassen's algorithm. Speed-ups are measured relative to standard (e.g., cuBLAS for GPU) matrix multiplication on the same hardware. Speed-ups are reported for various matrix sizes (despite optimizing the algorithm only on one matrix size) by executing the optimized algorithm recursively. The median speed-up is reported over 200 runs with a standard deviation of <0.4% over runs.

Figure 7C:
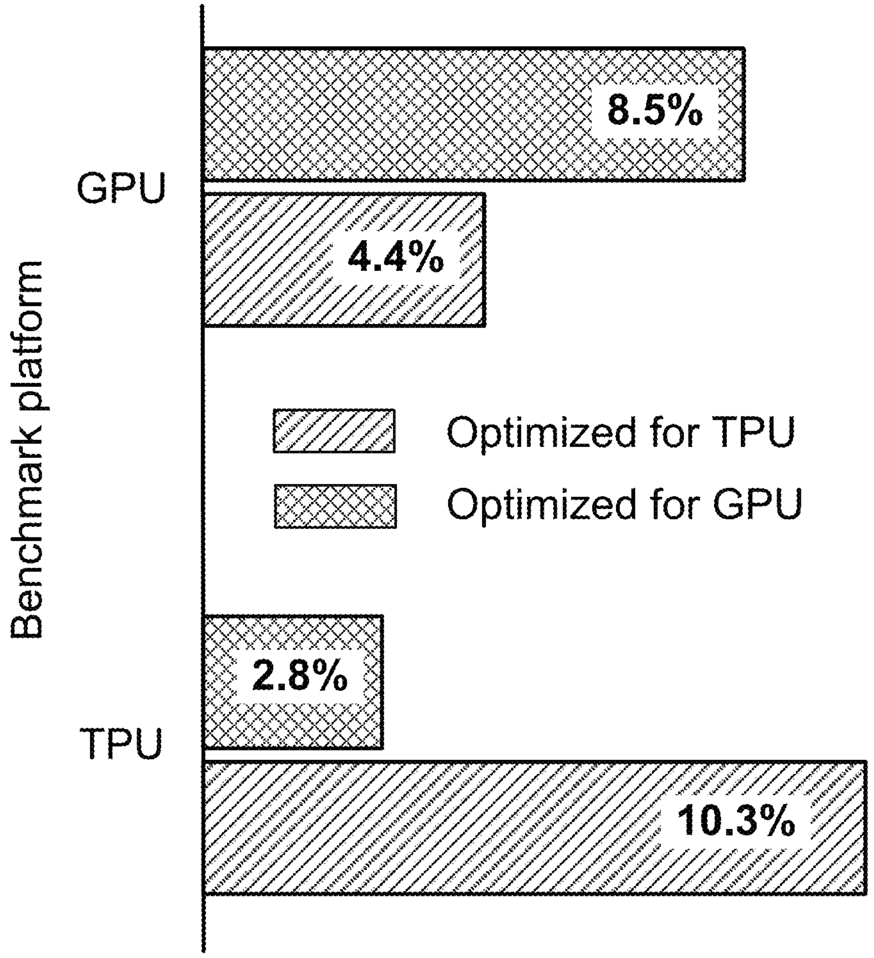

As seen in FIGS. 7A and 7B, the system 100 can tailor algorithms for specific hardware devices, such as GPUs and TPUs. However, as mentioned previously, an optimized algorithm for a specific hardware device may not perform optimally on a different hardwire device due to their differing processing architectures. FIG. 7C shows the differences in speed-up of both algorithms (tailored to GPU and TPU) benchmarked on both devices for a matrix size of 8192×8192. For example, when the algorithm optimized for TPU is run on a GPU, the speed-up relative to standard matrix multiplication is only 4.4%.

The target algorithm can be selected as a multilinear map which is a component of a data processing task, such as any known data processing task performed on input data obtained from the real-world (e.g. sensor data, such as data derived from a still camera, a video camera, a LIDAR sensor or a microphone) and/or performed to generate data which is used to generate a still or moving image (e.g. which is displayed on the screen) of one or more objects in the real world or resembling such objects, a sound data signal (e.g. which is used as an input to a speaker to generate a sound signal), or control data for any form of electro-mechanical agent (e.g. a robot) configured to perform a navigation and/or manipulation task in a real-world environment. For example, the data processing task may be a classification task of classifying the input data into one or more categories corresponding to the content of the input data, by generating output data indicative of the corresponding one or more of the categories; or the data processing task may be a task of generating a sound or image representing the semantic content of the data input; or the data processing task may be a task of generating the control data based on sensor data describing the environment. Alternatively, the data processing task may be a task of converting a data input which is an encoding of natural language (e.g. a text in a first natural language) into a data output which is another encoding of natural language (e.g. a text in another, different natural language) with the same semantic content. Thus, the example makes it possible to obtain an improved algorithm, specific to the set of one or more hardware devices, to perform the component of the data processing task.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers for obtaining an optimized algorithm that (i) is functionally equivalent to a target algorithm and (ii) optimizes one or more target properties when executed on a target set of one or more hardware devices, the method comprising:

initializing a target tensor representing the target algorithm;

generating, using a neural network having a plurality of network parameters, a tensor decomposition of the target tensor that parametrizes a candidate algorithm, wherein the neural network is configured to receive a state of a tensor as input and process the input in accordance with the network parameters to generate a network output comprising a policy for applying modifications to the tensor, and wherein generating the tensor decomposition comprises:

for each step in a sequence of steps:

obtaining a current state of the target tensor;

determining a target network output for the current state by performing a tree search of a state tree having nodes representing states of the target tensor starting from a root node that represents the current state, wherein the tree search is guided by the neural network in accordance with the network parameters;

applying a modification to the current state of the target tensor using the target network output for the current state; and determining whether to terminate the sequence based, at least in part, on whether the target tensor equals a zero tensor after the modification is applied; and generating the tensor decomposition from the modifications applied to the target tensor at each step in the sequence of steps, wherein the tensor decomposition is a factorization of the target tensor into a linear combination of rank-one terms that each represents a single linearly independent direction in a tensor product space and has a rank of one, wherein the rank-one terms of the factorization of the target tensor correspond to the modifications applied to the target tensor at each step in the sequence of steps;

generating target property values for each of the target properties when executing the candidate algorithm on the target set of hardware devices;

determining a benchmarking score for the tensor decomposition based on the target property values of the candidate algorithm;

generating a training example from the tensor decomposition and the benchmarking score, the training example including the state of the tensor and the target network output at each step in the sequence of steps; and storing, in a training data store, the training example for use in updating the network parameters of the neural network.

2. The method of claim 1, further comprising:

selecting, as the optimized algorithm, a particular candidate algorithm generated by using the neural network based on a benchmarking score for the particular candidate algorithm.

3. The method of claim 1, wherein the policy defines a probability distribution over possible rank-one terms to be subtracted from the tensor.

4. The method of claim 1, wherein the network output further comprises a return output defining an estimated return resulting from the tensor being in the state.

5. The method of claim 4, wherein the estimated return is an estimate of an expected benchmarking score of a tensor decomposition.

6. The method of claim 4, wherein the estimated return is an estimate of an expected rank of a tensor decomposition.

7. The method of claim 4, wherein performing the tree search comprises:

traversing edges connecting nodes of the state tree until a leaf node is reached based on action scores assigned to the edges, wherein edges represent possible modifications to be applied to the target tensor;

processing, using the neural network in accordance with the network parameters, a state of the target tensor represented by the leaf node to generate a network output for the leaf node;

expanding the state tree at the leaf node using a policy for the leaf node; and for each edge of the state tree that was traversed:

incrementing a visit count of the edge; and updating an action score for the edge based on a value constructed from a return output for the leaf node.

8. The method of claim 7, wherein performing the tree search further comprises:

storing, in a transposition table, one or more nodes encountered during the tree search;

determining, while traversing edges, that a newly encountered node represents a same state of the target tensor as a previously encountered node stored in the transposition table; and in response, transposing the newly encountered node with the previously encountered node.

9. The method of claim 7, wherein determining the target network output from the tree search further comprises:

smoothing, using an adaptive temperature scheme, visit counts of edges of the root node if a total visit count of all edges of the root node is greater than a maximum total visit count.

10. The method of claim 7, wherein determining the target network output from the tree search further comprises:

ignoring edges of the root node that have action scores lower than an action score of an edge of the root node with a highest visit count.

11. The method of claim 1, wherein initializing the target tensor comprises performing a change of basis on the target tensor, and wherein generating the tensor decomposition comprises performing an inverse change of basis on the tensor decomposition.

12. The method of claim 1, further comprising:

generating a set of tensor decompositions of one or more synthetic tensors, wherein a synthetic tensor is a randomly initialized tensor;

generating a set of synthetic training examples from the set of tensor decompositions of synthetic tensors; and storing, in the training data store, the set of synthetic training examples for use in updating the network parameters of the neural network.

13. The method of claim 1, further comprising:

retrieving, from the training data store, a training state of a tensor associated with a training target;

processing the training state using the neural network in accordance with the network parameters to generate a training network output;

determining a gradient with respect to the network parameters of an objective function that encourages the training network output to meet the training target for the training state; and updating the network parameters according to the gradient.

14. The method of claim 1, wherein the optimized algorithm is executed recursively on the target set of hardware devices.

15. The method of claim 1, wherein the target algorithm computes a bilinear map.

16. The method of claim 15, wherein the bilinear map is matrix multiplication.

17. The method of claim 1, wherein the target properties comprise at least one of:

computational complexity of the optimized algorithm, runtime of the target set of hardware devices when executing the optimized algorithm, cache performance of the target set of hardware devices when executing the optimized algorithm, locality of reference of the optimized algorithm when executed on the target set of hardware devices, or power consumption of the target set of hardware devices when executing the optimized algorithm.

18. The method of claim 1, wherein the target set of hardware devices is a simulation of a set of hardware devices.

19. The method of claim 1, wherein the target set of hardware devices comprise at least one of: a central processing unit (CPU), a graphics processing unit (GPU), a tensor processing unit (TPU), or an application-specific integrated circuit (ASIC).

20. The method of claim 1, further comprising:

receiving a new input; and performing the target algorithm on the new input by executing the optimized algorithm on the target set of hardware devices.

* * * * *